(12) United States Patent
Cheng et al.

(10) Patent No.: US 8,300,741 B2
(45) Date of Patent: Oct. 30, 2012

(54) INTERFERENCE DETECTOR AND METHOD THEREOF

(75) Inventors: Kai-Wen Cheng, Hsinchu Hsien (TW);
Ko-Yin Lai, Hsinchu Hsien (TW);
Yi-Ying Liao, Hsinchu Hsien (TW);
Tai-Lai Tung, Hsinchu Hsien (TW)

(73) Assignee: MStar Semiconductor, Inc. (TW)

( * ) Notice: Subject to any disclaimer, the term of this patent is extended or adjusted under 35 U.S.C. 154(b) by 351 days.

(21) Appl. No.: 12/789,244

(22) Filed: May 27, 2010

(65) Prior Publication Data
US 2010/0329396 A1 Dec. 30, 2010

Related U.S. Application Data

(60) Provisional application No. 61/219,784, filed on Jun. 24, 2009.

(51) Int. Cl.
*H04L 27/06* (2006.01)
(52) U.S. Cl. ........ 375/343; 375/316; 375/147; 375/148; 375/149; 375/150; 375/152; 375/346
(58) Field of Classification Search .................. 375/316, 375/147, 149, 150, 152, 148, 346, 343
See application file for complete search history.

(56) References Cited

U.S. PATENT DOCUMENTS
2004/0246173 A1* 12/2004 Arethens ................. 342/357.02
* cited by examiner

*Primary Examiner* — Siu Lee
(74) *Attorney, Agent, or Firm* — Andy M. Han; Han IP Law PLLC (57) ABSTRACT

An interference detector receives a data stream including predetermined symbols that include a first data and a second data, between which is a frequency offset. The interference detector includes a correlation apparatus that generates a first correlation result and a second correlation result according to the data stream; a power searching unit, coupled to the correlation apparatus, that generates a first maximum correlation result and a first neighboring power according to the first correlation result, and generates a second maximum correlation result and a second neighboring power according to the second correlation result; and a determining unit, coupled to the power searching unit, that generates a determination result according to the first maximum correlation result, the first neighboring power, the second maximum correlation result and the second neighboring power to indicate existence of interferences.

22 Claims, 11 Drawing Sheets

INTERFERENCE DETECTOR AND METHOD THEREOF

CROSS REFERENCE TO RELATED PATENT APPLICATIONS

This patent application claims priority from U.S. Provisional Patent Application No. 61/219,784, filed on Jun. 24, 2009, entitled "Interference Detector and Method Thereof", which application is hereby incorporated in its entirety by reference.

TECHNICAL FIELD

The present disclosure relates to an interference detector and a method thereof, and more particularly, to an interference detector and a method thereof capable of detecting interferences of signals received by a digital communication system.

BACKGROUND OF THE PRESENT DISCLOSURE

In a Digital Television Broadcasting system involving the Orthogonal Frequency-Division Multiplexing (OFDM) technology, co-channel interferences from analog television (TV) signals and in-band channel interferences need to be detected and removed. An analog TV signal is composed of continuous waves, e.g., image carriers and sound carriers, each having a fixed frequency. When the fixed frequency is exactly the same as a frequency of a sub-carrier in an OFDM system, information carried by the sub-carrier shall be damaged.

In a Digital Video Broadcasting over Terrestrial 2 (DVB-T2) system, a data stream transmitted in the form of frames has a P1 symbol at its start position, and the P1 symbol comprises information of a transmitting end, e.g., the information of a Fast Fourier Transform (FFT) mode applied to a data modulation, or information indicating whether a digital communication system is a single-input-single-output (SISO) or a multiple-input-signal-output mode (MISO).

Therefore, an apparatus and a method capable of accurately detecting interferences are in need.

SUMMARY OF THE PRESENT DISCLOSURE

The present disclosure provides an interference detector that receives a data stream comprising a predetermined symbol. The predetermined symbol comprises a first data and a second data, between which is a frequency offset. The interference detector comprises a correlation apparatus, for generating a first correlation result and a second correlation result according to the data stream; a power searching unit, coupled to the correlation apparatus, for generating a first maximum correlation result and a first neighboring power according to the first correlation result, and generating a second maximum correlation result and a second neighboring power according to the second correlation result; and a determining unit, coupled to the power searching unit, for generating a determination result according to the first maximum correlation result, the first neighboring power, the second maximum correlation result and the second neighboring power to indicate existence of interferences.

The present disclosure further provides a method for detecting interferences. The method comprises: generating a first correlation result and a second correlation result according to a data stream comprising a predetermined symbol that comprises a first data and a second data, between which is a frequency offset; generating a first maximum correlation result and a first neighboring power according to the first correlation result, and generating a second maximum correlation result and a second neighboring power according to the second correlation result; and generating a determination result according to the first maximum correlation result, the first neighboring power, the second maximum correlation result and the second neighboring power to indicate existence of interferences.

BRIEF DESCRIPTION OF THE DRAWINGS

Following description and figures are disclosed to gain a better understanding of the advantages of the present disclosure.

DETAILED DESCRIPTION OF THE PREFERRED EMBODIMENTS

An OFDM digital communication system comprises an interference detector and an interference filter. Once interferences are detected in the system, the interference detector outputs a signal to trigger the interference filter to remove the interferences. Accordingly, the interference filter need not be maintained perpetually activate, so that chip power consumption is reduced and signal processing efficiency of the system is increased as well. Therefore, an interference detector and a method thereof capable of accurately detecting interferences are in need.

Figure 1:
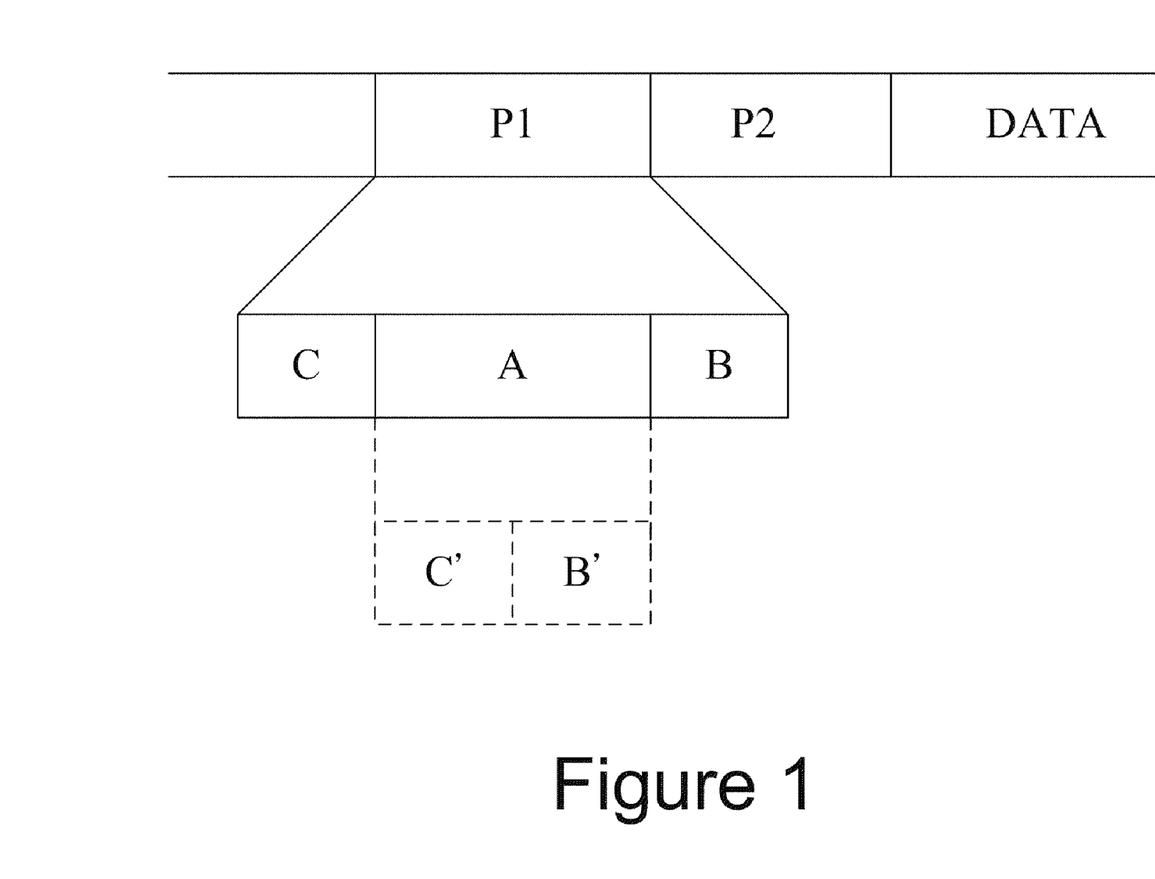
FIG. 1 is a schematic diagram of a digital data stream compliant to the DVB-T2 specification and a P1 symbol.

FIG. 1 shows a schematic diagram of a digital data stream compliant to the DVB-T2 specification and a P1 symbol. The data stream comprises the P1 symbol, a P2 symbol, and a data portion. The P1 symbol has a structure that comprises a data C having 542 samples and a time length $T_C$, a data A having 1024 samples and a time length $T_A$, and a data B having 482 samples and a time length $T_B$. The data C is a frequency shifted data of the first half (i.e., a data C') of the data A, and the data B is a frequency shifted data of the second half (i.e., a data B') of the data A, where the frequency offset $f_{sh}$ is $1/1024T$, and T is a sampling cycle of the digital data stream. The P1 symbol $p_1(t)$ is represented by:

$$p_1(t) = \begin{cases} p_{1A}(t)e^{j2\pi f_{SH}t} & 0 \leq t < 542T \\ p_{1A}(t - 542T) & 542T \leq t < 1566T \\ p_{1A}(t - 1024T)e^{j2\pi f_{SH}t} & 1566T \leq t < 2048T \\ 0 & \text{otherwise} \end{cases}$$

$$f_{SH} = \frac{1}{1024T}$$

where $p_{1A}$ is content of the data A, and T is the sampling cycle of the digital data stream.

Since the data C and the data B are respectively calculated by frequency shifting a partial of the data A, it is determined whether a currently received data is the P1 symbol by comparing correlations between the data C with data A, and data B with data A, and a position of the P1 symbol in the digital data stream is determined according to a correlations data generated by comparing the data C with data A and comparing data B with the data A, so as to accurately retrieve the P1 symbol from the digital data stream.

Figure 2:
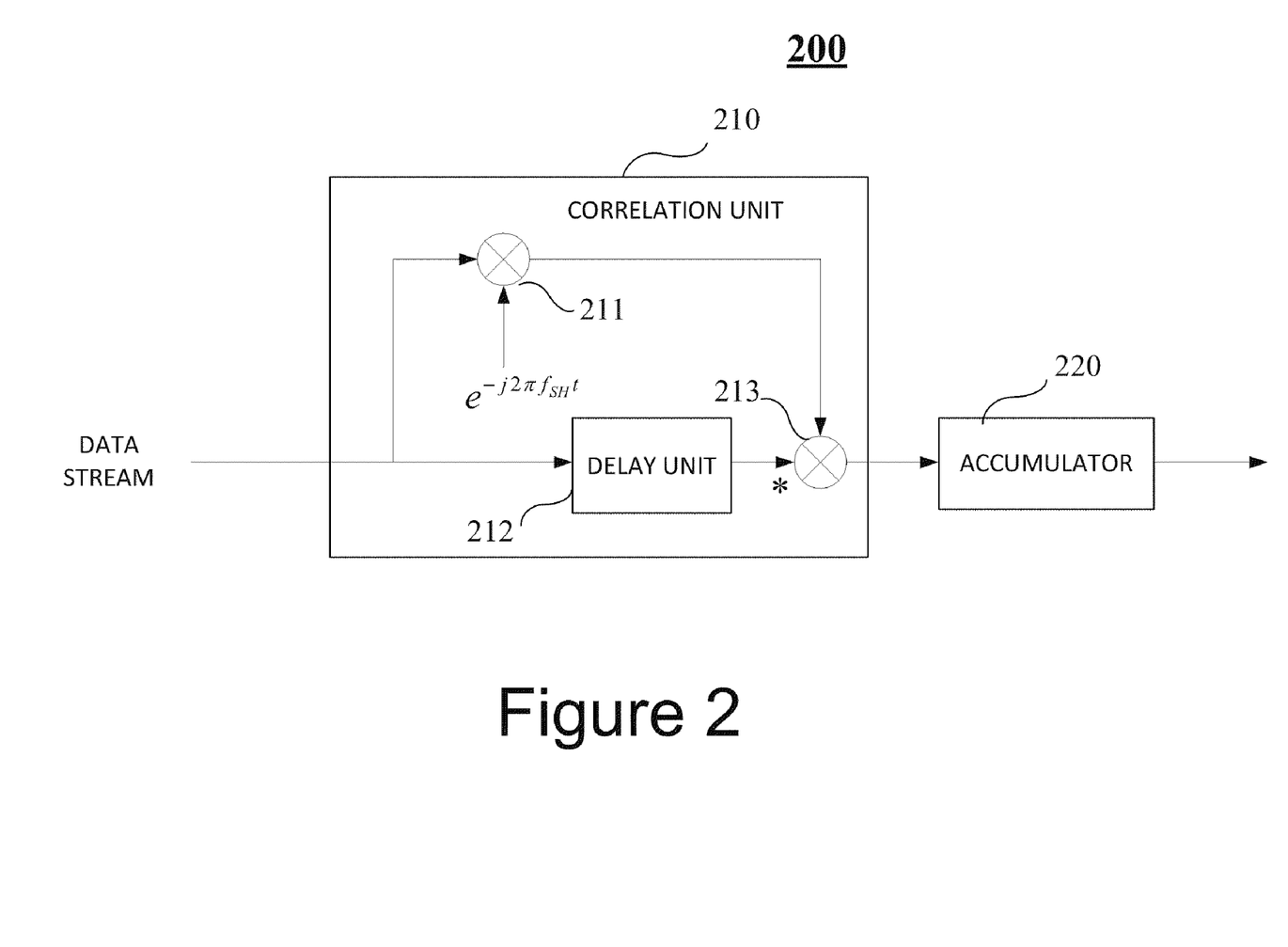
FIG. 2 is a block diagram of a correlation apparatus for detecting a P1 symbol in accordance with an embodiment of the present disclosure.
Figure 3:
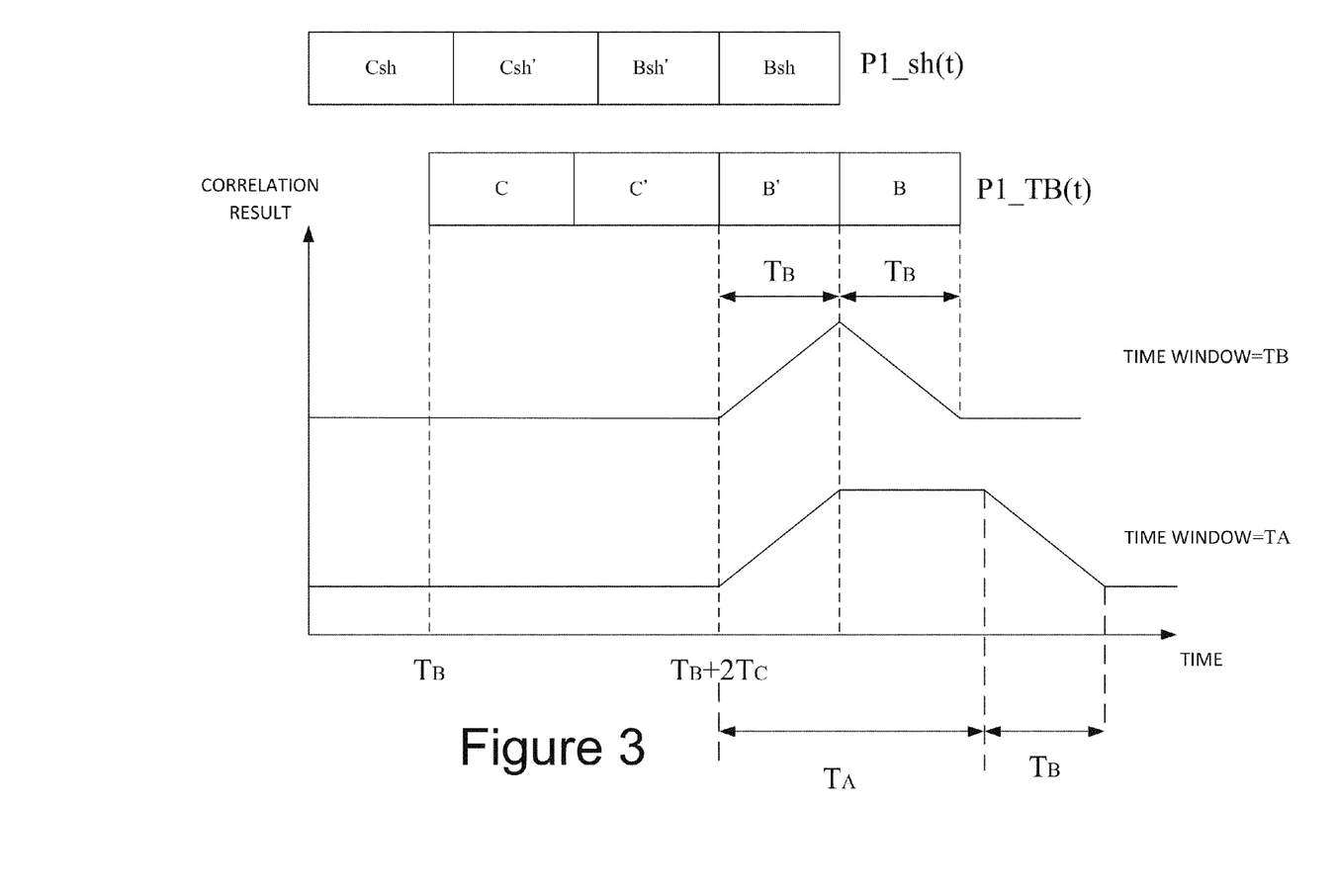
FIG. 3 is a schematic diagram of a frequency-shifted data, a delayed data, and a correlation result.

FIG. 2 shows a block diagram of a correlation apparatus 200 for detecting a P1 symbol in accordance with an embodiment of the present disclosure. The correlation apparatus 200 comprises a correlation unit 210 and an accumulator 220. The correlation unit 210 correlates a received data stream to generate a correlation data, and the accumulator 220 performs a time-domain windowing accumulation on the correlation data to generate a correlation result. When the maximum value of the correlation result is greater than a threshold on the time axis, it means that the P1 symbol is received. The correlation unit 210 comprises a frequency shifting unit 211, a delay unit 212, and a correlator 213. Refer to FIG. 2 and FIG. 3 to gain a better understanding of details on detecting the P1 symbol by the correlation apparatus 200. FIG. 3 is a schematic diagram of a frequency-shifted data P1_sh(t), a time-delayed data P1_TB(t), and a correlation result. At a time point t=0, the correlation unit begins to receive a data P1($t$) of the P1 symbol, and the frequency shifting unit 211 frequency shifts the data P1($t$) to generate the frequency-shifted data P1_sh(t). The frequency offset of the frequency shift is $-f_{sh}$, $f_{sh}$ is equal to $1/1024T$, and T is a sampling cycle of the digital data stream, such that data Csh and Bsh of the frequency-shifted data P1_sh(t) have a same frequency offset as data C' and B' of the data P1($t$). The delay unit 212 delays the data P1($t$) by a period $T_B$ to generate the delayed data P1_TB(t). At a time point t=$2T_C+T_B$, initial data of the data Bsh and the data B' simultaneously enter the correlator 213 for correlation calculation, so as to generate a correlation data. At a time point t=$2T_C+2T_B$, the correlation data of the data Bsh and the data B' enter the accumulator 220 to generate a correlation result. For example, when a time-domain window length of the accumulator 220 equals $T_B$ (i.e., 482T), which is the duration of the data B of the P1 symbol, the accumulated correlation result will have maximum value at the time point t=$2T_B+2T_C$. When the time-domain window length of the accumulator 220 equals $T_A$ (i.e., 1024T), the correlation result stays at a maximum value within a period $T_A$-$T_B$.

Referring to FIG. 2, when the correlation apparatus 200 receives continuous interferences having a fixed frequency interferences are mathematically represented by $e^{j2\pi f_1 t}$. The interferences $e^{j2\pi f_1 t}$ are processed by the correlation unit 210 to generate a correlation data which is represented as $e^{j2\pi(f_1-f_{SH})t} \cdot [e^{j2\pi f_1(t-T_B)}]^* = e^{j2\pi f_1 T_B}e^{-j2\pi f_{SH}t}$. After that, the correlation data enters the accumulator 220 for accumulation. When an accumulation time-domain window length equals $T_A$, which is the duration of the data A, preferably, $T_A$=1024T, the accumulated correlation result is calculated as:

$$\int_0^{T_A} e^{j2\pi f_1 T_B} e^{-j2\pi f_{SH}t} dt = e^{j2\pi f_1 T_B} \cdot \frac{-1}{j2\pi f_{SH}} e^{-j2\pi f_{SH}t} \Big|_0^{T_A} =$$

$$\frac{-e^{j2\pi f_1 T_B}}{j2\pi f_{SH}}(e^{-j2\pi f_{SH}T_A} - 1) = \frac{-e^{j2\pi f_1 T_B}}{j2\pi f_{SH}}(1 - 1) = 0$$

where $f_{SH} \cdot T_A = \frac{1}{1024T} \cdot 1024T = 1$.

Accordingly, the interferences are removed by the correlation apparatus 200 comprising the accumulator 220 having the time-domain window length $T_A$. When the time-domain window length of the accumulator 220 equals $T_B$ (i.e., 482T, the duration of data B of the P1 symbol), the accumulated correlation result is calculated as:

$$\int_0^{T_B} e^{j2\pi f_1 T_B} e^{-j2\pi f_{SH}t} dt = e^{j2\pi f_1 T_B} \cdot \frac{-1}{j2\pi f_{SH}} e^{-j2\pi f_{SH}t} \Big|_0^{T_B} =$$

$$\frac{-e^{j2\pi f_1 T_B}}{j2\pi f_{SH}}(e^{-j2\pi f_{SH}T_B} - 1) = \frac{-e^{j2\pi f_1 T_B}}{j2\pi f_{SH}}\left(e^{-j2\pi \frac{482}{1024}} - 1\right) \neq 0$$

From the calculated result shown above, the interferences still exists after process of the correlation apparatus 200 of the accumulator 220 having the time-domain window length $T_B$.

Figure 4:
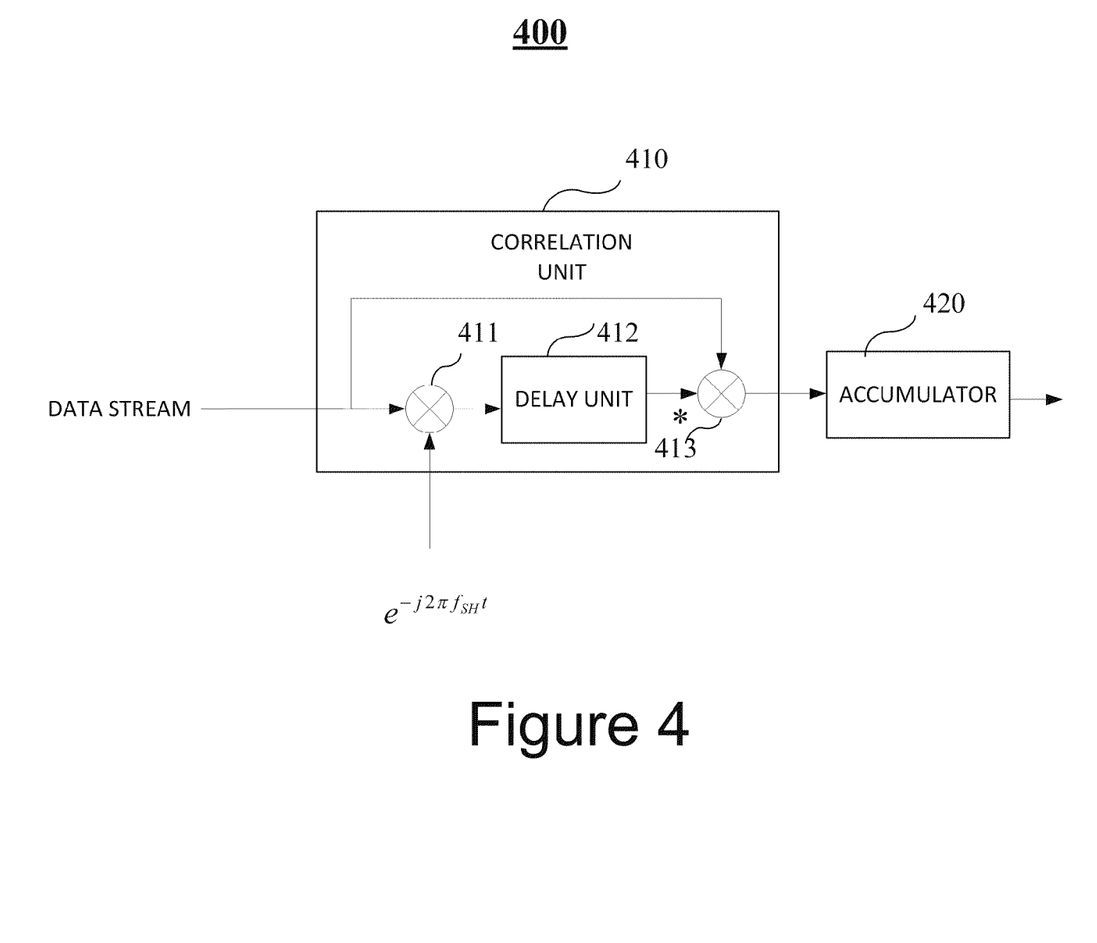
FIG. 4 is a block diagram of a correlation apparatus for detecting a P1 symbol in accordance with an embodiment of the present disclosure.
Figure 5:
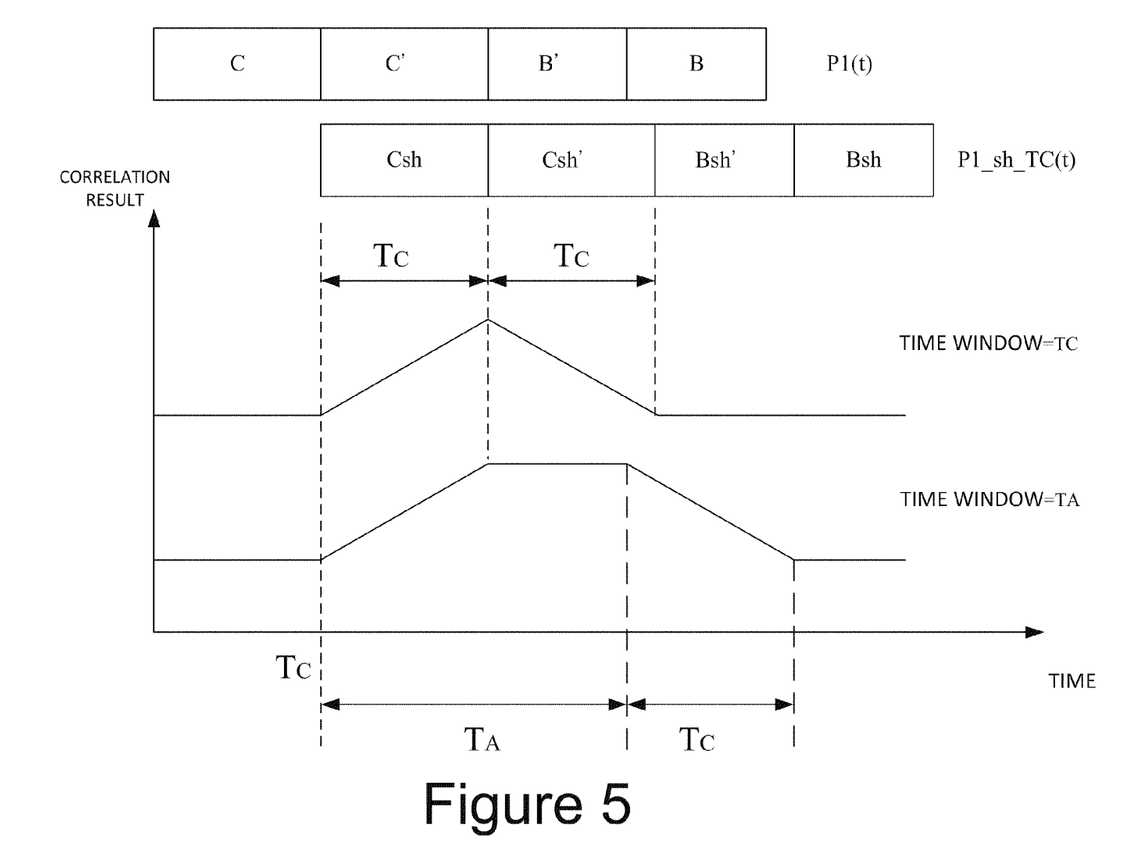
FIG. 5 is a schematic diagram of a data, a delayed frequency-shifted data, and a correlation result.

FIG. 4 is a block diagram of a correlation apparatus 400 for detecting a P1 symbol in accordance with an embodiment of the present disclosure. The correlation apparatus 400 comprises a correlation unit 410 and an accumulator 420. The correlation unit 410 correlates a received data to generate a correlation data, and the accumulator 420 performs time-domain windowing accumulation on the correlation data to generate a correlation result. When maximum value of the correlation result is greater than a threshold on the time axis, it means that the P1 symbol is received. The correlation unit 410 comprises a frequency shifting unit 411, a delay unit 412, and a correlator 413. Refer to FIG. 4 and FIG. 5 for more details on detecting the P1 symbol by the correlation apparatus 400. FIG. 5 is a schematic diagram of a data P1($t$), a time-delayed frequency-shifted data P1_sh_TC(t), and a correlation result. At a time point t=0, the correlation unit 410 begins to receive the data P1($t$) of the P1 symbol, and the frequency shifting unit 411 frequency shifts the data P1($t$) to generate a frequency-shifted data P1_sh(t). The frequency offset is $-f_{sh}$, $f_{sh}$ is equal to $1/1024T$, and T is a sampling cycle of the digital data stream, such that data Csh and Bsh of the frequency-shifted data P1_sh(t) have a same frequency offset as data C' and B' of the data P1($t$). The delay unit 412 delays the frequency-shifted data P1_sh(t) by a period $T_C$, so as to generate the delayed frequency-shifted data P1_sh_TC(t). At a time point t=$T_C$, initial data of the data Csh and the data C' simultaneously enter the correlator 413 to generate a correlation data. At a time point t=$2T_C$, the correlation data of the data Csh and the data C' enter the accumulator 420. When a time-domain window length of the accumulator 420 equals $T_C$ (i.e., 542T), which is the duration of the data C of the P1 symbol, the maximum value of the accumulated correlation result is at the time point t=$2T_C$. When the time-domain window length of the accumulator 420 equals $T_A$ (i.e., 1024T), which is the duration of the data A of the P1 symbol, the correlation result stays at a maximum value within a period $T_A$-$T_C$.

Again referring to FIG. 4, when the correlation apparatus 400 receives continuous interferences having a fixed frequency $f_1$, interferences are mathematically represented by $e^{j2\pi f_1 t}$, and a correlation data generated from processing the interferences $e^{j2\pi f_1 t}$ by the correlation unit 410 is represented as $e^{j2\pi f_1 t} \cdot [e^{j2\pi (f_1 - f_{SH})(t-T_C)}]^* = e^{j2\pi f_1 T_C} e^{j2\pi f_{SH}(t-T_C)}$. After that, the correlation data enters the accumulator 420 for accumulation. When an accumulation time-domain window length equals $T_A$ (i.e., 1024T), which is the duration of the data A, the accumulated correlation result is calculated as:

$$\int_0^{T_A} e^{j2\pi f_1 T_C} e^{j2\pi f_{SH}(t-T_C)} dt = e^{j2\pi (f_1 - f_{SH})T_C} \cdot \frac{1}{j2\pi f_{SH}} e^{j2\pi f_{SH} t} \Big|_0^{T_A} =$$

$$\frac{e^{j2\pi (f_1 - f_{SH})T_C}}{j2\pi f_{SH}} (e^{j2\pi f_{SH} T_A} - 1) = \frac{e^{j2\pi (f_1 - f_{SH})T_C}}{j2\pi f_{SH}} (1-1) = 0$$

where $f_{SH} \cdot T_A = \frac{1}{1024T} \cdot 1024T = 1.$

Accordingly, the interferences are removed by the correlation apparatus 400 comprising the accumulator 420 having the time-domain window length $T_A$. When the time-domain window length of the accumulator 420 equals $T_C$ (i.e., 542T) of the data C of the P1 symbol, the accumulated correlation result is calculated as:

$$\int_0^{T_C} e^{j2\pi f_1 T_C} e^{j2\pi f_{SH}(t-T_C)} dt =$$

$$e^{j2\pi (f_1 - f_{SH})T_C} \cdot \frac{1}{j2\pi f_{SH}} e^{j2\pi f_{SH} t} \Big|_0^{T_C} = \frac{e^{j2\pi (f_1 - f_{SH})T_C}}{j2\pi f_{SH}} (e^{j2\pi f_{SH} T_C} - 1) \neq 0$$

However, the interferences processed by the correlation apparatus 400 of the accumulator 420 having the time-domain window length $T_C$ still exist.

Figure 6:
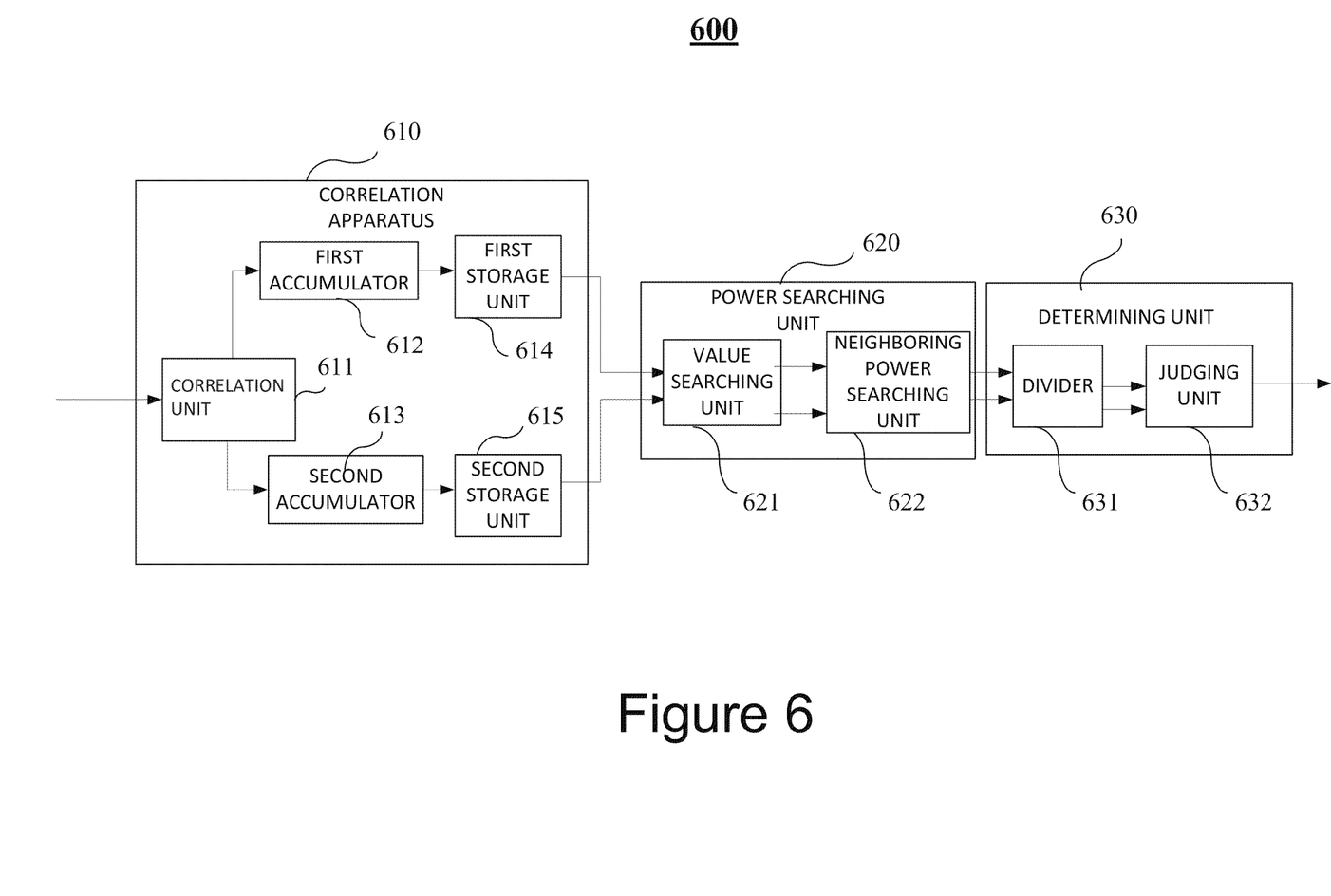
FIG. 6 is a block diagram of an interference detector in accordance with an embodiment of the present disclosure.

FIG. 6 is block diagram of an interference detector 600 in accordance with an embodiment of the present disclosure. The interference detector 600 comprises a correlation apparatus 610, a power searching unit 620, and a determining unit 630. The correlation apparatus 610 comprises a correlation unit 611, a first accumulator 612, a second accumulator 613, a first storage unit 614, and a second storage unit 615. The correlation unit 611 correlates a received data to generate a correlation data, and details of the correlation unit 611 are identical to those of the correlation unit 210 in FIG. 2 and the correlation unit 410. The first accumulator 612 accumulates the correlation data by using a first time-domain window length $T_A$ to generate a first correlation result to be stored into the first storage unit 6. The second accumulator 613 accumulates the correlation data by using the second time-domain window length, which is smaller than $T_A$, to generate a second correlation result to be stored into the second storage unit 615. When the correlation unit 611 is realized by the correlation unit 210, preferably, the second time-domain window length is $T_B$; when the correlation unit 611 is realized by the correlation unit 410, preferably, the second time-domain window length is $T_C$. The power searching unit 620 comprises a maximum value searching unit 621 and a neighboring power searching unit 622. The maximum value searching unit 621 searches for a maximum value on the time axis from the first correlation result of the first storage unit 614 to determine a first maximum correlation result, and searches for a maximum value on the time axis from the second correlation result of the second storage unit 615 to determine a second maximum correlation result. By adopting a search range, the neighboring power searching unit 622 searches for a right side power and a left side power from the first correlation result, where the central point of the left and right sides is defined by the time point at which the first maximum correlation result locates, and generates a first neighboring power according to the right side power and the left side power. For example, the first neighboring power is an average of the right side power and the left side power or the smaller of the two. Likewise, the neighboring power searching unit 622 generates a second neighboring power according to the second correlation result. The determining unit 630 generates a determination result according to the first maximum correlation result, the first neighboring power, the second maximum correlation result, the second neighboring power, and a determination condition. For example, the determining unit 630 comprises a divider 631 and a judging unit 632. The divider 631 divides the first maximum correlation result by the first neighboring power to generate a first power ratio, and divides the second maximum correlation result by the second neighboring power to generate a second power ratio. The judging unit 632 compares the first power ratio with the second power ratio to generate a judgment result. For example, when a ratio of the first power ratio and the second power ratio is greater than a threshold ratio, i.e., when the first power ratio is greater than twice of the second power ratio, it is determined that interferences exist; otherwise, it is determined that interferences are not received. Alternatively, the determining unit 630 comprises a multiplier (not shown) and the judging unit 632. For example, the multiplier multiplies the first maximum correlation result by the second neighboring power to generate a first power product, and multiplies the second maximum correlation result by the first side power to generate a second power product. Likewise, the judging unit 632 generates a judgment result according to the first power product and the second power product as an indication of existence of interference.

Figure 7A:
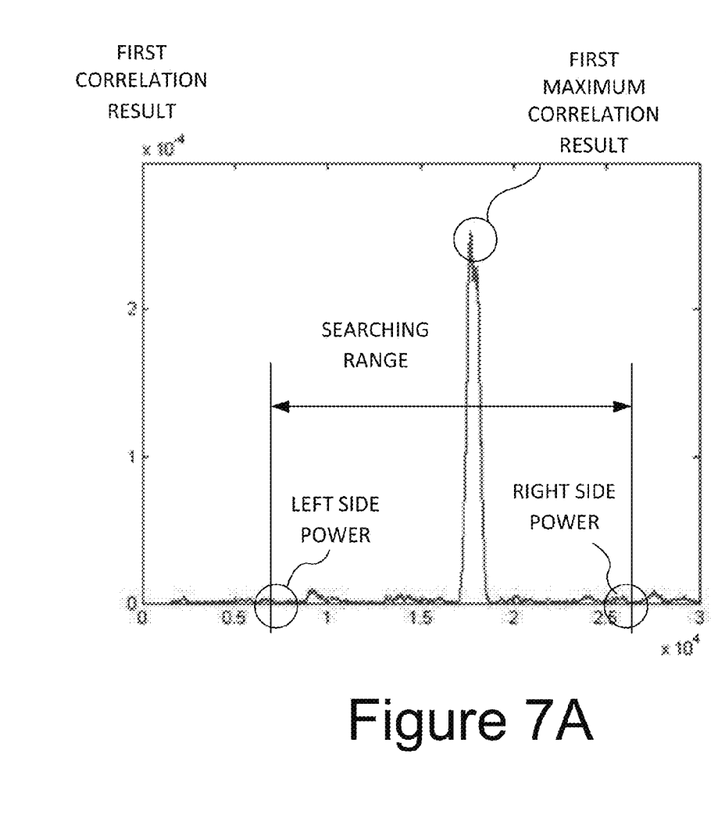
FIG. 7A is a schematic diagram of a first correlation result when interferences are not received.
Figure 7B:
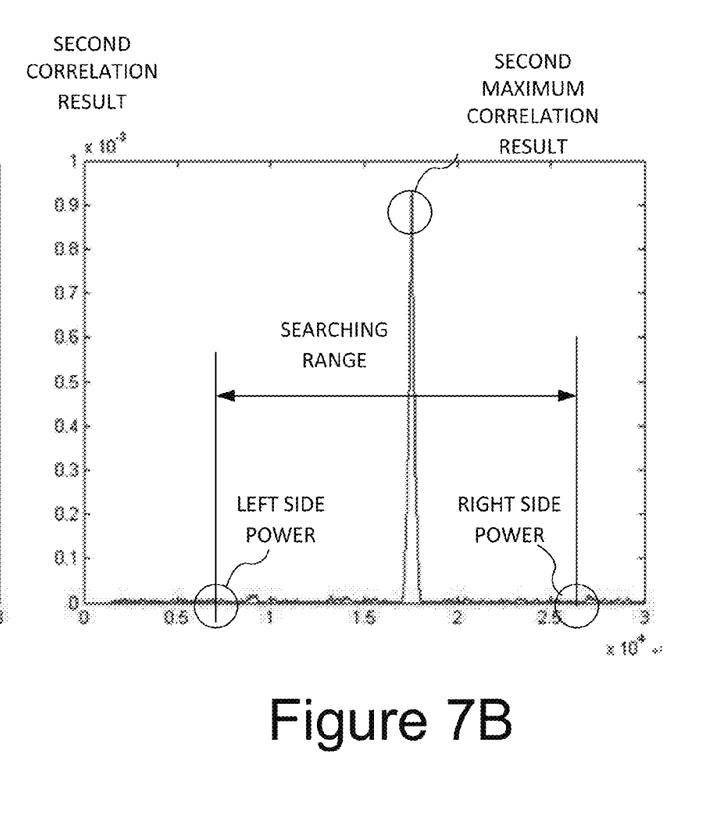
FIG. 7B is a schematic diagram of a second correlation result when interferences are not received.

FIGS. 7A and 7B show schematic diagrams of the first correlation result and the second correlation result, respectively, when interferences are not received. In FIGS. 7A and 7B, a maximum value on the time axis in both FIGS. 7A and 7B represents that a P1 symbol is received, and a start time point of the received P1 symbol is determined according to a time point corresponding to the maximum value. A right side power and a left side power are determined by using a search range having the time point corresponding to the maximum value as a central point to respectively obtain a first neighboring power and a second neighboring power to thereby obtain a first power ratio and a second power ratio. Referring to FIGS. 7A and 7B, when interferences are not received, a waveform of the first correlation result is approximate to that of the second correlation result, and accordingly the first power ratio is also approximate to the second power ratio.

Figure 8A:
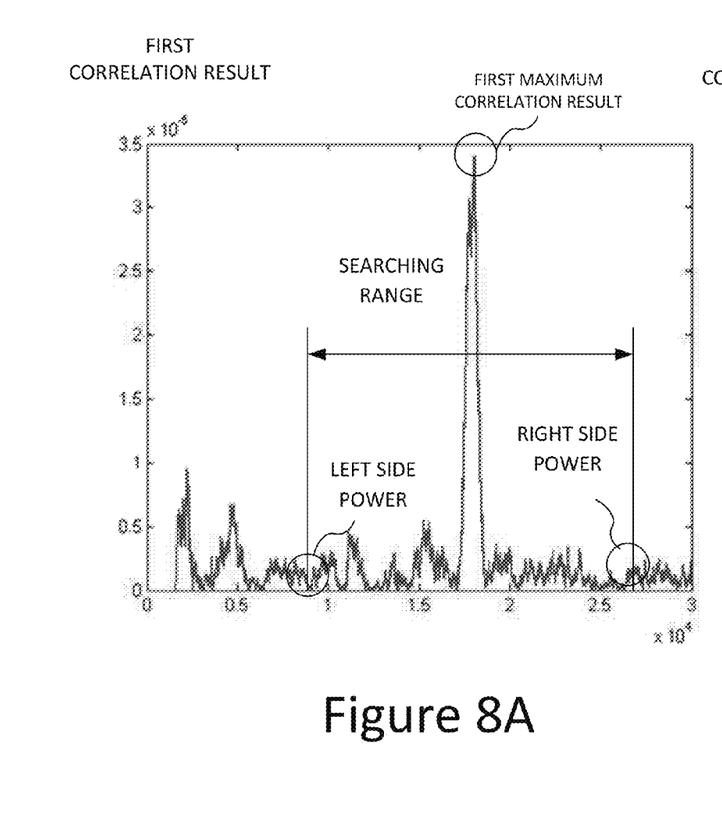
FIG. 8A is a schematic diagram of a first correlation result when interferences are received.
Figure 8B:
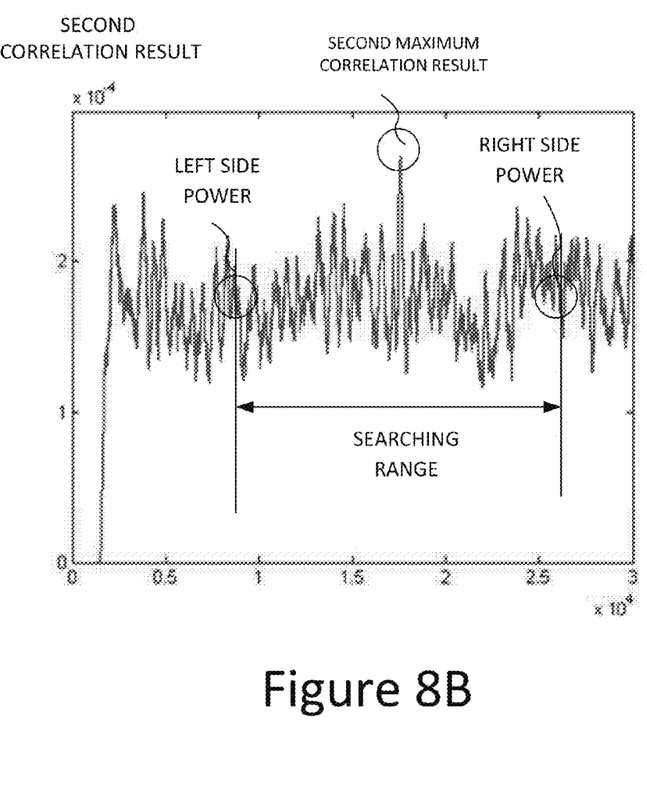
FIG. 8B is a schematic diagram of a second correlation result when interferences are received.

FIGS. 8A and 8B show schematic diagrams of a first correlation result and a second correlation result, respectively, when interferences are received. Since the first correlation result is processed by accumulation of a time-domain window length $T_A$, the correlation result contributed by interferences is removed. Therefore, the waveform peak of the first correlation result is still obvious on the time axis. However, after the second correlation result is processed by accumulation of a time-domain window length $T_B$ or $T_C$, the correlation result contributed by interferences cannot be removed, such that an unobvious peak of waveform of the second correlation result is created on the time axis. At this point, difference between the second maximum correlation result and the second neighboring power is by far smaller than the difference between the first maximum correlation result and the first neighboring power, such that the first power ratio is far greater than the second power ratio. It is to be noted that, in order to prevent the interferences from causing complications on searching for the second maximum correlation result, since maximum values of the first correlation result and the second correlation result occur at a same time point after a P1 symbol is received, the second correlation result corresponding to the time point corresponding to the first maximum correlation result is regarded as the second maximum correlation result. In addition, in order to prevent of the interferences from causing complications on detecting the P1 symbol according to the second correlation results, the first correlation result that is unaffected by the interferences is mainly applied to determine whether the P1 symbol is received. More specifically, in one embodiment, when the first correlation result is greater than a user-defined threshold correlation value, it is determined that the P1 symbol is received. After that, a left side power and a right side power corresponding to the search range are obtained for calculating the first power ratio and the second power ratio, so as to determine whether the interferences are received.

Figure 9:
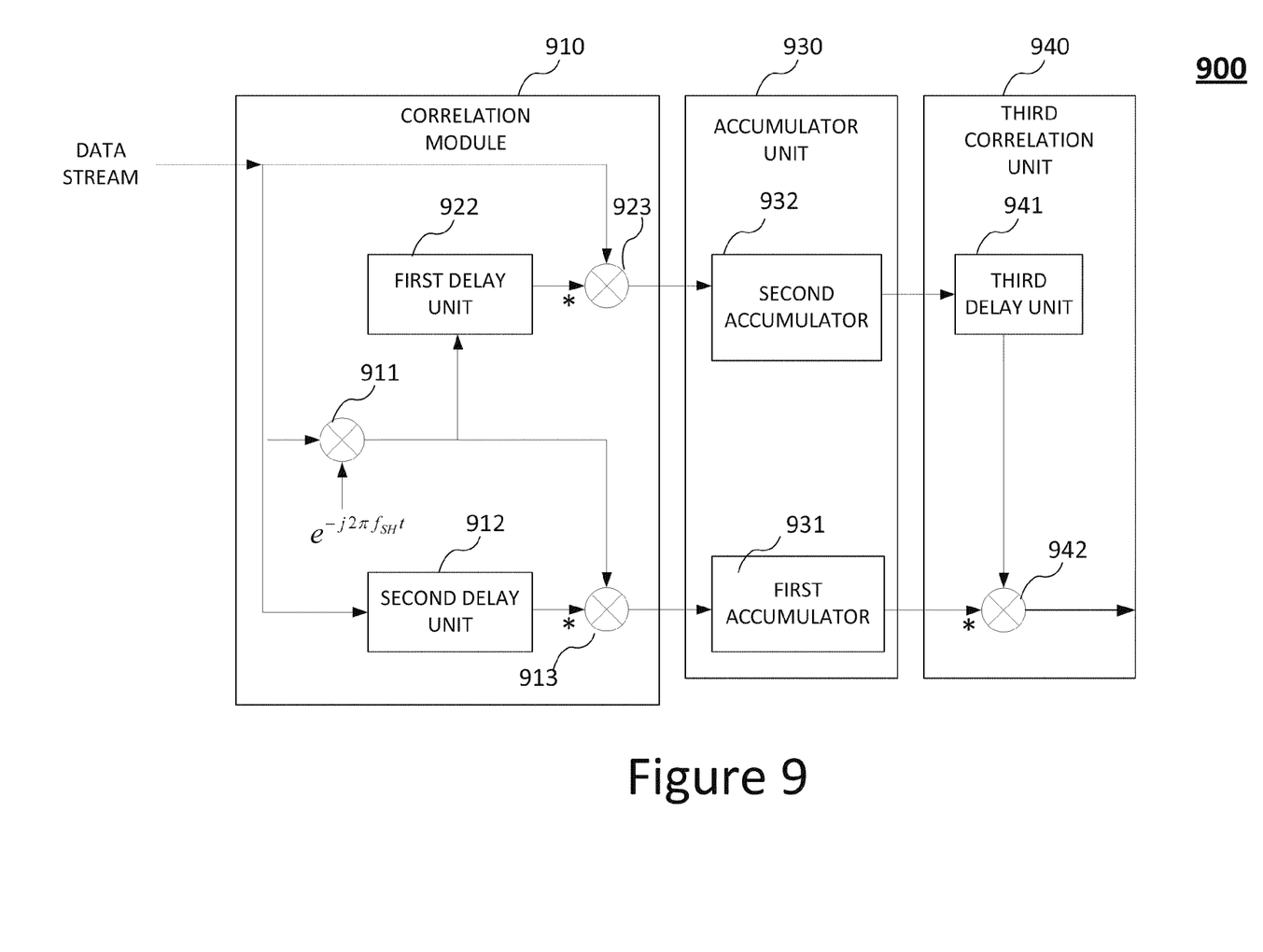
FIG. 9 is a schematic diagram of a correlation apparatus in accordance with an embodiment of the present disclosure.

FIG. 9 shows a schematic diagram of a correlation apparatus 900 in accordance with an embodiment of the present disclosure. The correlation apparatus 900 comprises a correlation module 910, an accumulating unit 930, and a third correlation unit 940. The correlation module 910 comprises a frequency shifting unit 911, a first delay unit 922, a second delay unit 912, and two correlators 913 and 923. The accumulation unit 930 comprises a first accumulator 931 and a second accumulator 932. Referring to both FIG. 9 and FIG. 2, the frequency shifting unit 911, the second delay unit 912, the correlator 913 and the first accumulator 931 in FIG. 9 are respectively similar to the frequency shifting unit 211, the delay unit 212, the correlator 213 and the accumulator 220 in FIG. 2. The frequency shifting unit 911, the second delay unit 912 and the correlator 913 are regarded as a first correlation unit for generating a first correlation data, and the first accumulator 931 accumulates the first correlation data to generate a first accumulated correlation data. Referring to both FIG. 9 and FIG. 4, the frequency shifting unit 911, the first delay unit 922, the correlator 923 and the second accumulator 932 are respectively similar to the frequency shifting unit 411, the delay unit 412, the correlator 413, and the accumulator 420. The frequency shifting unit 911, the first delay unit 922 and the correlator 923 are regarded as a second correlation unit to generate a second correlation data. The second accumulator 932 accumulates the second correlation data to generate a second accumulated correlation data. When a P1 symbol is received, the first accumulated correlation data generated by the first accumulator 931 and the second accumulated correlation data generated by the second accumulator 932 both depict a peak on the time axis. The third correlation unit 940 comprises a third delay unit 941 and a correlator 942. The third delay unit 941 aligns the peak of waveform of the first correlation result with that of the second correlation result, so that a correlation result having an even more obvious peak is generated by multiplying the two by the correlator 942, and thereby increasing the accuracy in identifying of a maximum correlation result and a time point corresponding to the maximum correlation result. It is to be noted that, since the correlation result is observed by comparing its absolute values, the correlator 942 can be modified as not using complex-conjugate multiplication, and such modification shall not undesirably affect the correlation result.

Figure 10:
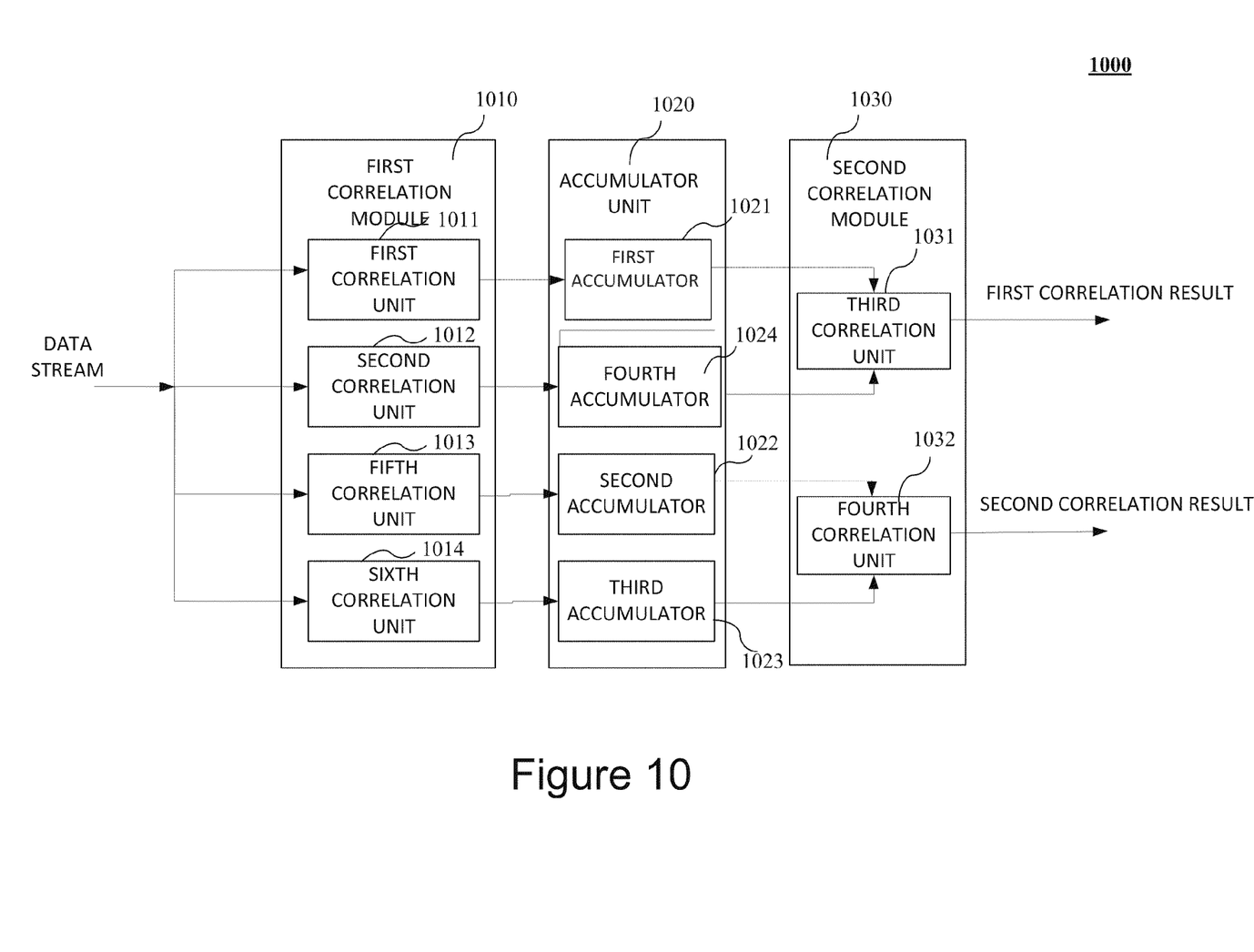
FIG. 10 is a block diagram of a correlation apparatus applied to an interference detector in accordance with an embodiment of the present disclosure.

FIG. 10 shows a block diagram of a correlation apparatus 1000 applied to an interference detector 600 in accordance with an embodiment of the present disclosure. The correlation apparatus 1000 comprises a first correlation module 1010, an accumulation unit 1020, and a second correlation module 1030. The first correlation module 1010 comprises the first correlation unit 1010 and the second correlation unit 1012, which respectively correlate data streams to generate a first correlation data and a second correlation data. Referring to FIGS. 2, 4, and 10, the first correlation unit 1011 is realized by the correlation unit 410 in FIG. 4, and the second correlation unit 1012 is realized by the correlation unit 210 in FIG. 2. Referring to FIGS. 10 and 9, the correlation apparatus 1000 is regarded as an embodiment using two parallel correlation apparatuses 900. The first correlation module 1010 also comprises a fifth correlation unit 1013 and a sixth correlation unit 1014, functions and structures of which are identical to those of the first correlation unit 1011 and the second correlation unit 1012, so as to perform parallel processing thereby saving calculation time. The accumulation unit 1020 comprises a first accumulator 1021, a second accumulator 1022, a third accumulator 1023, and a fourth accumulator 1024. The first accumulator 1021 accumulates the first correlation data via a time-domain window length $T_A$ to generate a first accumulated correlation data. The fourth accumulator 1024, identical to the first accumulator 1021, accumulates the second correlation data via the time-domain window length $T_A$ to generate a second accumulated correlation data. The second accumulator 1022 accumulates the first correlation data via a time-domain window length $T_C$ to generate a third accumulated correlation data. The third accumulator 1023 accumulates the second correlation data via a time-domain window length $T_B$ to generate a fourth accumulated correlation data. The second correlation module 1030 comprises a third correlation unit 1031 and a fourth correlation unit 1032. Referring to FIG. 9 and FIG. 10, the third correlation unit 1031 and the fourth correlation unit 1032 are realized by the third correlation unit 940 in FIG. 9. A delay time of the third delay unit 941 corresponding to the third correlation unit 1031 is $T_A$, and the third correlation unit 1031 delays the first accumulated correlation data by the delay time $T_A$, and then multiplies the delayed first accumulated correlation data by the second accumulated correlation data, so as to generate a first correlation result. A time delay of the third delay unit 941 corresponding to the fourth correlation unit 1032 is $2T_B$, and the fourth correlation unit 1032 delays the third accumulated correlation data by $2T_B$, and then multiplies the delayed third accumulated correlation data by the fourth accumulated correlation data, so as to generate a second correlation result. Therefore, when a data stream has a P1 symbol without interferences, the first correlation result and the second correlation result both have a maximum value on the time axis as shown in FIGS. 7A and 7B. When a received data stream has a P1 symbol and interferences, the first accumulator 1021 and the accumulator 1024 having a time-domain window length $T_A$ can remove the interferences, whereas the second accumulator 1022 and the third accumulator 1023 still cannot remove the interferences, such that waveform of the second correlation result is damaged by the interferences as shown in FIGS. 8A and 8B. Referring to FIG. 10 and FIG. 6, as observed from the foregoing description, the correlation apparatus 1000 is applied to another embodiment of the correlation apparatus 610 of the interference detector 600.

It is to be noted that, a time-domain window length of the second accumulator 1022 approximately equals to the number of samples of a data C of the P1 symbol, i.e., the time-domain window length is 542 or an integer neighboring to 542. Likewise, a time-domain window length of the third accumulator 1023 approximately equals to the number of samples of a data B of the P1 symbol, i.e., the time-domain window length is 482 or an integer neighboring to 482. In addition, when simplification of circuit complexity and circuit cost reduction are taken into consideration, the time-domain window length is designed as $2^M$, where M is an integer, and, out of all values of 2 raised to an n-th power, $2^M$ is proximal to the number of samples of a data C of the P1 symbol, i.e., the time-domain window length of the second accumulator 1022 is 512. The time-domain window length of the third accumulator 1023 is $2^N$, N is an integer, and, out of all values of 2 raised to an n-th power, $2^N$ is proximal to the number of samples of a data B of the P1 symbol, i.e., the time-domain window length of the second accumulator 1023 is 512.

Figure 11:
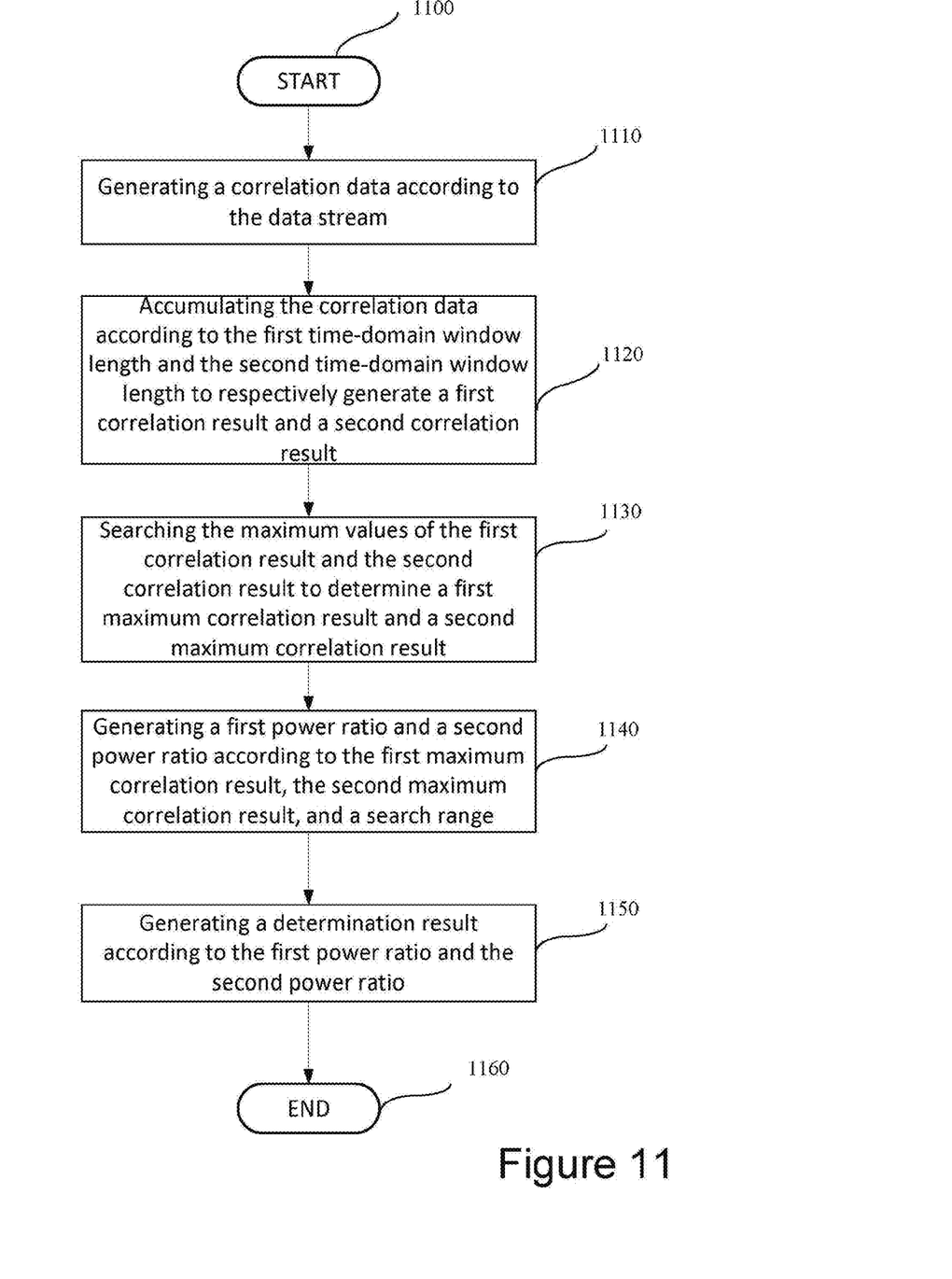
FIG. 11 is a flow chart of a method for detecting interferences in accordance with an embodiment of the present disclosure.

FIG. 11 shows a flow chart of a method for detecting interferences in accordance with an embodiment of the present disclosure. The interference method is for detecting existence of interferences in a received data stream comprising a P1 symbol. The flow starts with Step 1100. The next Step 1110 includes correlating the data stream to generate a correlation data. For example, according to characteristics of the P1 symbol, two calculation methods are applied for correlating the data stream. In one embodiment, the correlating method is that shifting frequency of a data P1(t) to generate a frequency-shifted data P1_sh(t) with a frequency offset $f_{sh}$ of $\frac{1}{1024}T$, where T is a sampling cycle of a digital data stream, and the data P1(t) is time-delayed by $T_B$ to generate a delayed data P1_TB(t), which is complex-conjugate multiplied by the frequency-shifted data P1_sh(t) to generate a correlation data. In another embodiment, correlating method is shifting frequency of the data P1(t) to generate a frequency-shifted data P1_sh(t) with a frequency offset $f_{sh}$ of $\frac{1}{1024}T$, and delaying the frequency-shifted data P1_sh(t) by time $T_C$ to generate a time-delayed frequency-shifted data P1_sh_TC(t), which is complex-conjugate multiplied by the data P1(t) to generate a correlation data. Next, Step 1120 includes accumulating the correlation data according to the first time-domain window length and the second time-domain window length to respectively generate a first correlation result and a second correlation result. The first time-domain window length is $T_A$, i.e., 1024T, and the second time-domain window length is smaller than $T_A$. Preferably, supposing the first method is adopted as the correlation processing method in Step 1110, the second time-domain window length is $T_B$; supposing the second method is adopted as the correlation processing method in Step 1110, the second time-domain window length is $T_C$. The first correlation result and the second correlation result may also be generated by: performing the two foregoing methods to generate a first correlation data and a second correlation data; accumulating the first correlation data and the second correlation data via the first time-domain window length $T_A$ to generate a first accumulated data and a second accumulated data; correlating the first accumulated data and the second accumulated data to generate a first correlation result; accumulating according to the first method via the second time-domain window length $T_B$ to generate a third accumulated data; accumulating according to the second method via the third time-domain window length $T_c$ to generate a fourth accumulated data; and correlating the third accumulated data and the fourth accumulated data to generate a second correlation result. The method further includes Step 1130, searching the maximum values of the first correlation result and the second correlation result to determine a first maximum correlation result and a second maximum correlation result. Preferably, this step includes searching the second maximum correlation result according to a time point corresponding to the first maximum correlation result. In Step 1140, generating a first power ratio and a second power ratio according to the first maximum correlation result, the second maximum correlation result, and a search range. For example, one embodiment of this step is obtaining a right side search correlation result and a left side searching correlation result according to the time point corresponding to the first maximum correlation result and the search range, and determining a first neighboring power according to the right side search correlation result and the left side search correlation result. More specifically, the first neighboring power is a smaller one of the right side search correlation result and the left side search correlation result or an average of the two. The step includes obtaining the first power ratio by multiplying the first maximum correlation result by the first neighboring power. Likewise, the second power ratio is also obtained. In Step 1150, it precedes the step of generating a determination result according to the first power ratio and the second power ratio. For example, a ratio of the first power ratio and the second power ratio is calculated and is compared with a threshold ratio. Supposing that the threshold ratio is 2, and a determination condition is that when the ratio of the power ratio and the second power ratio is greater than 2, i.e., the first power ratio is greater than twice of the second power ratio, it is determined that interferences are received; otherwise, it is determined that interferences are not received. The threshold ratio is defined according to tolerance capability of a system with respect to interferences. Alternatively, Step 1140 and Step 1150 includes generating a first power product by multiplying the first maximum correlation result by the second neighboring power, generating a second power product by multiplying the second maximum correlation by the first neighboring power, and generating a determination result according to the first power product and the second power product. Likewise, an object of determining existence of interferences is also achieved. The flow ends in Step 1160.

In conclusion, the present disclosure provides an interference detector that receives a data stream comprising a predetermined symbol comprising a first data and a second data, between which is a frequency offset. The interference detector comprises a correlation apparatus, a power searching unit, and a determining unit. The correlation apparatus generates a first correlation result and a second correlation result according to the data stream. The power searching unit, coupled to the correlation apparatus, generates a first maximum correlation result and a first neighboring power according to the first correlation result, and generates a second maximum and a second neighboring power according to the second correlation result. The determining unit, coupled the power searching unit, generates a determination result according to the first maximum correlation result, the first neighboring power, the second maximum correlation result and the second neighboring power to indicate existence of interferences.

The present disclosure further provides a method for detecting interferences. The method comprises: generating a first correlation result and a second correlation result according to a data stream comprising a predetermined symbol comprising a first data and a second data, between which is a frequency offset; generating a first maximum result and a first neighboring power according to the first correlation result, and generating a second maximum result and a second neighboring power according to the second correlation result; and generating a determination result according to the first maximum correlation result, the first adjacent power, the second maximum correlation result and the second neighboring power to indicate existence of interferences.

While the present disclosure has been described in terms of what is presently considered to be the most practical and preferred embodiments, it is to be understood that the present disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An interference detector for processing a data stream having a predetermined symbol comprising a first data and a second data, with a frequency offset between the first data and the second data, the interference detector comprising:
    a correlation apparatus that generates a first correlation result and a second correlation result according to the predetermined symbol in the data stream;
    a power searching unit, coupled to the correlation apparatus, that generates a first maximum correlation result and a first neighboring power according to the first correlation result, and generates a second maximum correlation result and a second neighboring power according to the second correlation result; and
    a determining unit, coupled to the power searching unit, that generates a determination result according to the first maximum correlation result, the first neighboring power, the second maximum correlation result, and the second neighboring power, the determination result being indicative of an existence of interferences.

2. The interference detector as claimed in claim 1, wherein the power searching unit comprises:
    a value searching unit that searches for a maximum value of the first correlation result to generate the first maximum correlation result, and searches for a maximum value of the second correlation result to generate the second maximum correlation result; and
    a neighboring power searching unit that generates the first neighboring power according to the first maximum correlation result and a search range, and generates the second neighboring power according to the second maximum correlation result and the search range.

3. The interference detector as claimed in claim 1, wherein the correlation apparatus comprises a correlation unit that correlates the data stream at least according to the frequency offset to generate a correlation data.

4. The interference detector as claimed in claim 3, wherein the correlation apparatus further comprises a first accumulator, having a first time-domain window length being reciprocal of the frequency offset, and wherein the first accumulator accumulates the correlation data by the first time-domain window length to generate the first correlation result.

5. The interference detector as claimed in claim 4, wherein the correlation apparatus further comprises a second accumulator, having a second time-domain window length smaller than the reciprocal of the frequency offset, and wherein the second accumulator accumulates the correlation data by the second time-domain window length to generate the second correlation result.

6. The interference detector as claimed in claim 3, wherein the correlation unit comprises:
    a frequency shifting unit that frequency shifts the data stream by the frequency offset to generate a frequency-shifted data;
    a delay unit, coupled to the frequency shifting unit, that delays the frequency-shifted data to generate a time-delayed frequency-shifted data; and
    a correlator, coupled to the delay unit, that complex-conjugate multiplies the data stream by the delayed frequency-shifted data to generate the correlation data.

7. The interference detector as claimed in claim 3, wherein the correlation unit comprises:
    a frequency shifting unit that frequency shifts the data stream by the frequency offset to generate a frequency-shifted data;
    a delay unit that delays the data stream to generate a time-delayed data; and
    a correlator, coupled to the delay unit and the frequency shifting unit, that complex-conjugate multiplies the frequency-shifted data by the time-delayed data to generate the correlation data.

8. The interference detector as claimed in claim 1, wherein the correlation apparatus comprises:
    a first correlation module that generates a first correlation data and a second correlation data according to the data stream;
    an accumulation unit, coupled to the first correlation module, that generates a first accumulated correlation data and a third accumulated correlation data according to the first correlation data, and generates a second accumulated correlation data and a fourth accumulated correlation data according to the second correlation data; and
    a second correlation module, coupled to the accumulation unit, that generates the first correlation result according to the first accumulated correlation data and the second accumulated correlation data, and generates the second correlation result according to the third accumulated correlation data and the fourth accumulated correlation data.

9. The interference detector as claimed in claim 8, wherein the first correlation module comprises:
    a first correlation unit that generates the first correlation data according to the data stream; and
    a second correlation unit that generates the second correlation data according to the data stream.

10. The interference detector as claimed in claim 9, wherein the accumulation unit comprises:
    a first accumulator, having a first time-domain window length being reciprocal of the frequency offset, that respectively generates the first accumulated correlation data and the second accumulated correlation data according to the first correlation data and the second correlation data via the first time-domain window length;
    a second accumulator, having a second time-domain window length smaller than reciprocal of the frequency offset, that generates the third accumulated correlation data according to the first correlation data via the second time-domain window length; and
    a third accumulator, having a third time-domain window length smaller than reciprocal of the frequency offset, that generates the fourth accumulated correlation data according to the second correlation data via the third time-domain window length.

11. The interference detector as claimed in claim 10, wherein the second correlation module comprises:
    a third correlation unit that generates the first correlation result according to the first accumulated correlation data, the second accumulated correlation data, and a first time delay; and a fourth correlation unit that generates the second correlation result according to the third accumulated correlation data, the fourth accumulated correlation data, and a second time delay.

12. The interference detector as claimed in claim 9, wherein the first correlation unit comprises:
   a frequency shifting unit that frequency shifts the data stream to generate a frequency-shifted data;
   a delay unit, coupled to the frequency shifting unit, that delays the frequency-shifted data to generate a time-delayed frequency-shifted data; and
   a correlator, coupled to the delay unit, that complex-conjugate multiplies the data stream by the delayed frequency-shifted data to generate the first correlation data.

13. The interference detector as claimed in claim 9, wherein the second correlation unit comprises:
   a frequency shifting that frequency shifts the data stream to generate a frequency-shifted data;
   a delay unit that delays the data stream to generate a time-delayed data; and
   a correlator, coupled to the delay unit and the frequency shifting unit, that complex-conjugate multiplies the frequency-shifted data by the delayed data to generate the second correlation data.

14. A method for detecting interferences, applied to a receiving end of a digital television (TV) for receiving a data stream having a predetermined symbol comprising a first data and a second data with a frequency offset between the first and second data, the method comprising:
   generating a first correlation result and a second correlation result according to the predetermined symbol in the data stream;
   generating a first maximum correlation result and a first neighboring power according to the first correlation result;
   generating a second maximum correlation result and a second neighboring power according to the second correlation result; and
   determining whether or not interferences are present according to the first maximum correlation result, the first neighboring power, the second maximum correlation result, and the second neighboring power.

15. The method as claimed in claim 14, wherein generating the first and second maximum correlation results and the first and second neighboring powers comprises:
   respectively searching for maximum values of the first correlation result and the second correlation result to generate the first maximum correlation result and the second maximum correlation result;
   determining the first neighboring power according to the first maximum correlation result and a search range; and
   determining the second neighboring power according to the second maximum correlation result and the search range.

16. The method as claimed in claim 14, wherein generating the first correlation result and the second correlation result comprises:
   correlating the data stream to generate a correlation data; and
   accumulating the correlation data via a first time-domain window length and a second time-domain window length to respectively generate the first correlation result and the second correlation result, the first time-domain window length being a reciprocal of the frequency offset and the second time-domain window length being smaller than the reciprocal of the frequency offset.

17. The method as claimed in claim 16, wherein generating the correlation data comprises:
   frequency shifting the data stream to generate a frequency-shifted data;
   delaying the frequency-shifted data to generate a time-delayed frequency-shifted data; and
   complex-conjugate multiplying the data stream by the time-delayed frequency-shifted data to generate the correlation data.

18. The method as claimed in claim 16, wherein generating the correlation data comprises:
   frequency shifting the data stream to generate a frequency-shifted data;
   delaying the data stream to generate a time-delayed data; and
   complex-conjugate multiplying the frequency-shifted data by the time-delayed data to generate the correlation data.

19. The method as claimed in claim 14, wherein generating the first correlation result comprises:
   generating a first correlation data and a second correlation data according to the data stream;
   respectively accumulating the first correlation data and the second correlation data via a first time-domain window length to generate a first accumulated correlation data and a second accumulated correlation data, the first time-domain window length being a reciprocal of the frequency offset; and
   generating the first correlation result according to a first time delay, the first accumulated correlation data, and the second accumulated correlation data.

20. The method as claimed in claim 19, wherein generating the second correlation result comprises:
   generating the first correlation data and the second correlation data according to the data stream;
   accumulating the first correlation data via a second time-domain window length to generate a third accumulated correlation data, the second time-domain window length being smaller than the reciprocal of the frequency offset;
   accumulating the second correlation data via a third time-domain window length to generate a fourth accumulated correlation data, the third time-domain window length being smaller than the reciprocal of the frequency offset; and
   generating the second correlation result according to a second delay time, the third accumulated correlation data, and the fourth accumulated correlation data.

21. The method as claimed in claim 20, wherein generating the first and second correlation data comprises:
   frequency shifting the data stream to generate a first frequency-shifted data;
   delaying the data stream to generate a first time-delayed data; and
   complex-conjugate multiplying the first frequency-shifted data by the first time-delayed data to generate the first correlation data.

22. The method as claimed in claim 21, wherein generating the first and second correlation data further comprises:
   frequency shifting the data stream to generate a second frequency-shifted data;
   delaying the second frequency-shifted data to generate a second time-delayed frequency-shifted data; and
   complex-conjugate multiplying the data stream by the second time-delayed frequency-shifted data to generate the second correlation data.

* * * * *